Oct. 22, 1929.

P. J. McINERNEY

CONCRETE JOINT FORM

Original Filed June 9, 1925

Re. 17,465

Inventor:

Peter J. McInerney

By Monroe C. Miller

Attorney.

Reissued Oct. 22, 1929

Re. 17,465

UNITED STATES PATENT OFFICE

PETER J. McINERNEY, OF DALLAS, TEXAS, ASSIGNOR, BY MESNE ASSIGNMENTS, TO J. N. HELTZEL, OF WARREN, OHIO

CONCRETE JOINT FORM

Original No. 1,634,263, dated July 5, 1927, Serial No. 35,860, filed June 9, 1925. Application for reissue filed February 23, 1929. Serial No. 342,244.

This invention relates to joint forms or division plates for use in the construction of concrete roads or other surfacing structures or matrices wherein joints, parting lines or partial parting lines may be necessary or desirable.

An object of the invention is to provide a joint form or division plate which may be used with continuous mat or mesh reinforcement, without the necessity of such reinforcement being divided or separated at the joints, and which form or plate will provide the joint or parting line.

Another object is to provide a device which may be attached to the mesh reinforcement, and swung or moved to the desired position on the reinforcement after the latter is properly positioned, or the device may be made an integral part of the reinforcement when it is fabricated and may be placed in position with the reinforcement.

Another object is to provide a joint form or division plate having means for rigidly sustaining it in position on the reinforcing mesh.

A feature of the invention is the simplicity and economy in construction.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illlstrated in the accompanying drawing, wherein—

Figure 1:
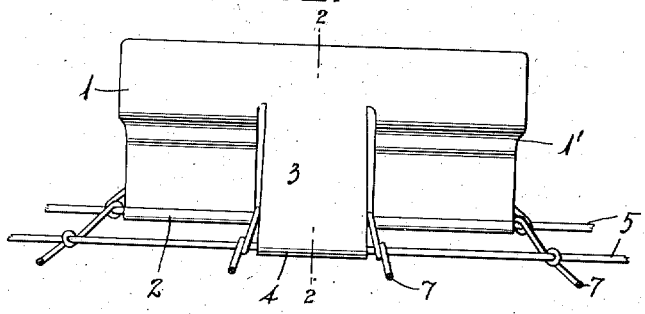
Figure 1 is a perspective view of one embodiment of the invention showing the joint form or division plate in position on the reinforcing mesh.
Figure 2:
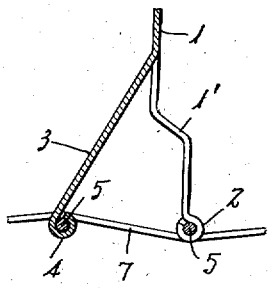
Fig. 2 is a cross section on the line 2—2 of Fig. 1.

Referring to Figs. 1 and 2, the joint form or division plate 1 is of suitable sheet metal, and is formed with an offset 1′ between the upper and lower edges thereof, although the plate may be of various cross-sections, according to the cross section of joint that is desired.

The lower edge portion of the plate 1 is formed with the hinge sleeves 2 which loosely embrace one of the longitudinal rods or wires 5 of the substantially flat reinforcing mesh, such as is commonly embedded in concrete roads and other surfacing structures. This permits the plate 1 to be swung against the mesh in storage and shipment, and the plate may be swung to erect position when the reinforcing mesh has been placed over the subbase of the road.

The plate 1 may be of any suitable length and has cut therefrom one or more braces 3, only one brace being shown in Figs. 1 and 2. The brace 3 is inclined and has its lower end portion bent into a sleeve 4 to embrace another longitudinal rod or wire 5 of the mesh, thereby holding the division plate or joint form in the desired position, and the construction will be rigid and substantial.

The transverse rods or wires of the mesh are indicated at 7, and may extend through the slits of the plate 1 formed by the braces 3.

The plate 1 may be of any suitable length and may be used longitudinally or transversely of a road or other matrix, for producing either a longitudinal or a transverse joint. Thus, when the reinforcing mesh is in position with the division plate thereon, the concrete is poured over them, and the division plate will divide or separate the concrete along the desired line, in order to produce the joint or parting line. With the division plate above the reinforcement, as seen in Figs. 1 and 2, the plate only divides the concrete above the reinforcement, but when the concrete has hardened it will break below the mesh or reinforcement along the line of the plate.

Figure 3:
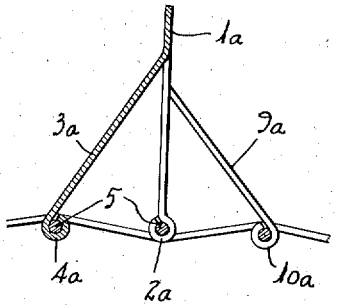
Figs. 3, 4, 5 and 6 are cross sections of modifications.

Fig. 3 illustrates the division plate $1^a$ as being flat and having the sleeves $2^a$ at its lower edge hingedly embracing one of the rods 5, and braces $3^a$ and $9^a$ are struck from opposite sides of the plate and have the sleeves or portions $4^a$ and $10^a$, respectively, at their lower ends embracing other rods at the opposite sides of the plate. The division plate is thus braced on opposite sides.

Figure 4:
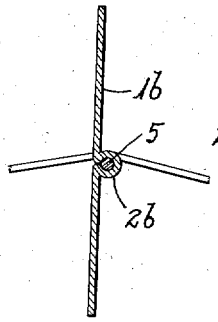

Fig. 4 illustrates a division plate $1^b$ extending above and below the mesh and formed between its upper and lower edges with a sleeve portion $2^b$ to embrace the reinforcing rod 5. This division plate will divide the concrete above and below the mesh.

Figure 5:
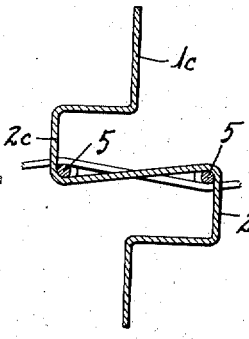

Fig. 5 illustrates a division plate $1^c$ whose upper and lower edge portions are in the same vertical plane, and the intermediate portion of the plate is offset toward opposite sides, as at $2^c$, to engage across a pair of rods 5.

Figure 6:
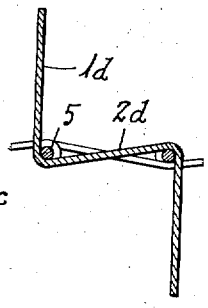

Fig. 6 illustrates a division plate $1^d$ having the oblique offset $2^d$ forming bends to engage a pair of the rods 5, with the upper and lower edge portions of the plate offset in different vertical planes.

The division plates shown in Figs. 4, 5 and 6 may be welded or otherwise rigidly secured to the reinforcement, and may be applied at the factory where the mesh is fabricated or at the locality where the mesh is installed.

Figure 7:
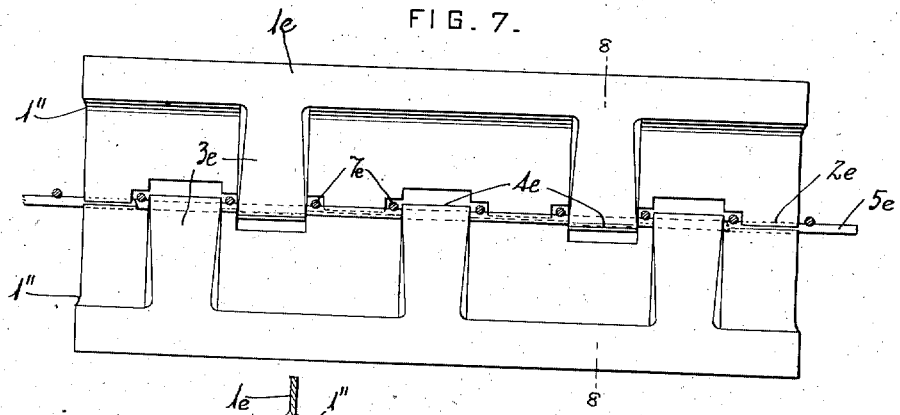
Fig. 7 is an elevation of another modification.
Figure 8:
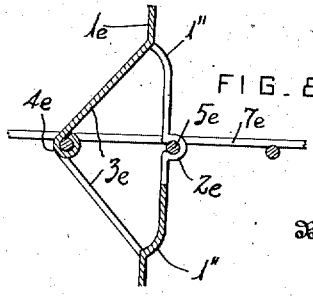
Fig. 8 is a cross section on the line 8—8 of Fig. 7.

Figs. 7 and 8 illustrate a joint form or division plate $1^e$ extending above and below the reinforcement, and having the offsets $1''$, with the sleeve $2^e$ at the intermediate portion embracing one of the reinforcing rods $5^e$. Braces $3^e$ are struck from the plate 12 and below the mesh and have the sleeves $4^e$ to embrace another reinforcing rod. The plate has notches or openings through which the rods $7^e$ extend. This division plate substantially duplicates the division plate of Figs. 1 and 2 above and below the reinforcing mesh, using a single structure. However, the rods $7^a$ will require insertion through the plate $1^a$ before the rods $5^e$ and $7^e$ are welded or otherwise secured at their points of crossing.

Having thus described the invention, what is claimed as new is:—

1. In a device of the character described, a sheet of rigid material having a plurality of planes and curves and adapted to be attached to mesh reinforcement used in concrete or like constructions, and means forming a part of said sheet in attachment to said mesh to rigidly maintain the attachment of the sheet and the mesh.

2. In a device of the character described, a plate of rigid material adapted to be secured by one or a plurality of hinges to the mesh reinforcement of concrete or other similar matrix construction, and means formed from the plate and extending therefrom to the reinforcement mesh, said means adapted to maintain the plate in rigid relationship to the reinforcement mesh.

3. In a joint form for concrete or similar construction having mesh reinforcement, a rigid plate member having a plurality of planes or curves therein means to secure said member to the mesh reinforcement employed in said construction, and means forming a part of said plate member to rigidly secure said member in desired position with respect to the reinforcement mesh.

4. The combination with concrete reinforcement, of a division plate hingedly connected with said reinforcement and having a brace to engage the reinforcement for holding the plate in place.

5. The combination with reinforcing mesh to be embedded in a concrete slab, of a joint member for dividing the slab hingedly connected with the mesh to swing to and from the plane of the mesh.

6. The combination with reinforcing mesh to be embedded in a concrete slab, of a joint member for dividing the slab hingedly connected with the mesh to swing to and from the plane of the mesh, and means for holding said member in position when swung away from the mesh.

7. The combination with reinforcing mesh to be embedded in a concrete slab, of a joint member for dividing the slab hingedly connected with the mesh to swing to and from the plane of the mesh, said member having a brace to engage the mesh for holding said member in place.

8. The combination with reinforcing mesh to be embedded in a concrete slab, of a joint member for dividing the slab, the mesh having rods parallel with said member, and said member hingedly engaging one of said rods.

9. The combination with reinforcing mesh to be embedded in a concrete slab, of a joint member for dividing the slab, the mesh having rods parallel with said member, said member hingedly engaging one of said rods, and said member having a brace to engage another of said rods.

10. A joint member for use with reinforcing mesh to divide a concrete slab and having a hinge portion to engage the mesh so that the joint member can swing to and from the plane of the mesh.

11. A joint member for use with reinforcing mesh to divide a concrete slab and having a hinge portion to engage the mesh so that the joint member can swing to and from the plane of the mesh, and having a brace to engage the mesh for holding said member in place when swung away from the mesh.

12. A joint member for use with reinforcing mesh for dividing a concrete slab having portions to embrace a rod of the mesh which is parallel with said member for hingedly mounting said member on the mesh.

13. A joint member for use with reinforcing mesh for dividing a concrete slab having portions to embrace a rod of the mesh which is parallel with said member for hingedly mounting said member on the mesh, and having a brace adapted to engage another parallel rod of said mesh for holding said member in place when swung away from the mesh.

14. A joint member to be used with reinforcing mesh for dividing a concrete slab, and means for hingedly mounting said member on such mesh for the swinging movement of said member to and from the plane of said mesh.

15. A concrete road reinforcing and joint structure comprising fabricated reinforcing mesh to be embedded in the road, and a joint member disposed on said mesh to divide the concrete between the mesh and upper surface of the road, said member having bent portions embracing portions of said mesh, said mesh crossing said member and being substantially flat at the point where it crosses said member.

16. A concrete road reinforcing and joint structure comprising reinforcing mesh adapted to be embedded in a concrete road slab, and a joint member disposed over said mesh for dividing the concrete between said mesh and the surface of the road, the mesh having rods parallel with said member, said member being secured to one of said rods to be supported by the mesh during the pouring of the material in building the slab, and said mesh crossing said member and being substantially flat at the point where it crosses said member.

17. A concrete road reinforcing and joint structure comprising reinforcing mesh adapted to be embedded in a concrete road slab, and a joint member disposed over said mesh for dividing the concrete between said mesh and the surface of the road, the mesh having rods parallel with said member, said member being secured to a plurality of said rods to be supported by the mesh during the pouring of the material in building the slab, and said mesh crossing said member and being substantially flat at the point where it crosses said member.

18. A concrete road reinforcing and joint structure comprising reinforcing mesh adapted to be embedded in a concrete road slab, and a joint member disposed over said mesh for dividing the concrete between said mesh and the surface of the road, said mesh having rods parallel with said member, said member having portions embracing one of said rods to support said member from the mesh during the pouring of the material in building the slab, and said mesh crossing said member and being substantially flat at the point where it crosses said member.

19. A concrete road reinforcing and joint structure comprising reinforcing mesh adapted to be embedded in a concrete road slab, and a joint member disposed over said mesh for dividing the concrete between said mesh and the surface of the road, said mesh having rods parallel with said member, said member having portions embracing a plurality of said rods to support said member from the mesh during the pouring of the material in building the slab, and said mesh crossing said member and being substantially flat at the point where it crosses said member.

In testimony whereof I have signed my name to this specification.

PETER J. McINERNEY.